R. W. THOMPSON.
STICK CANDY CUTTING MECHANISM.
APPLICATION FILED DEC. 20, 1919.
1,355,017.
Patented Oct. 5, 1920.
5 SHEETS—SHEET 3.
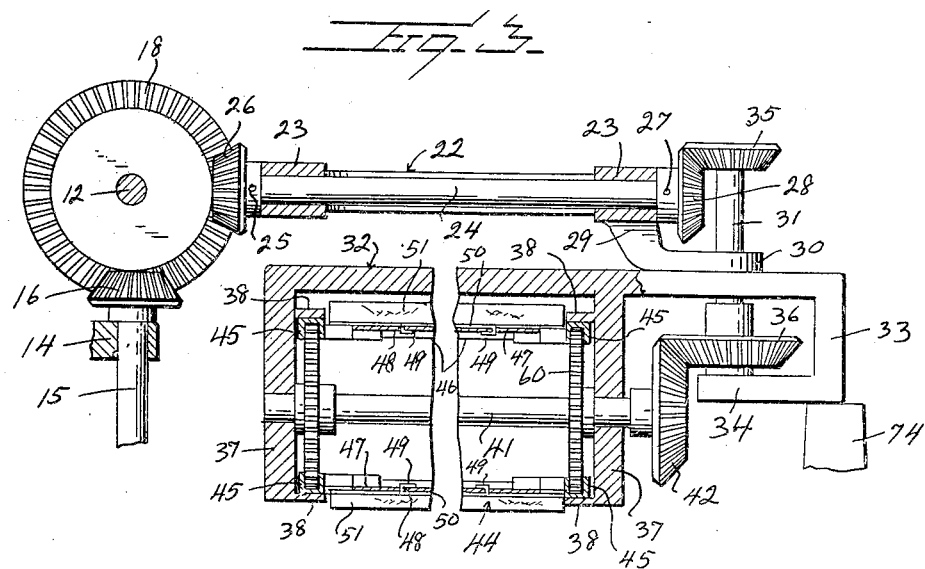
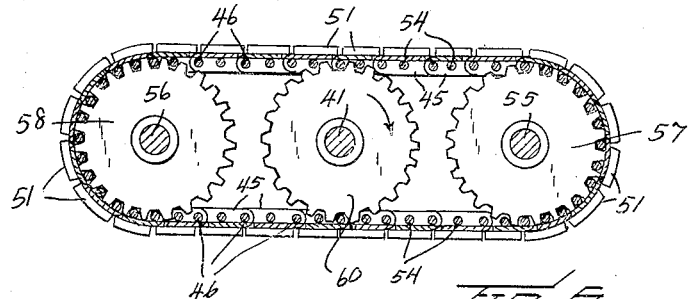
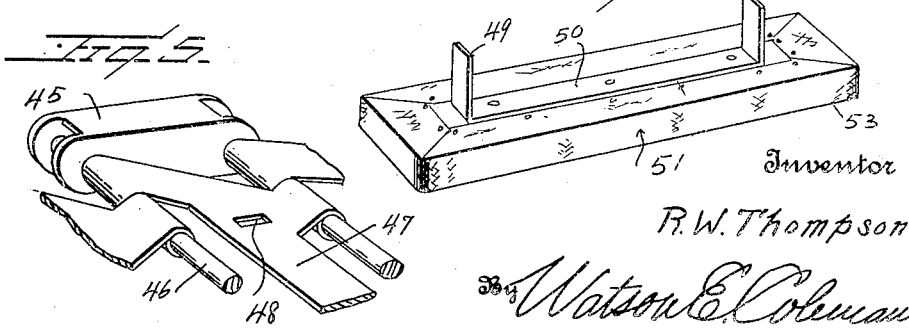
Inventor
R. W. Thompson
By Watson E. Coleman
Attorney

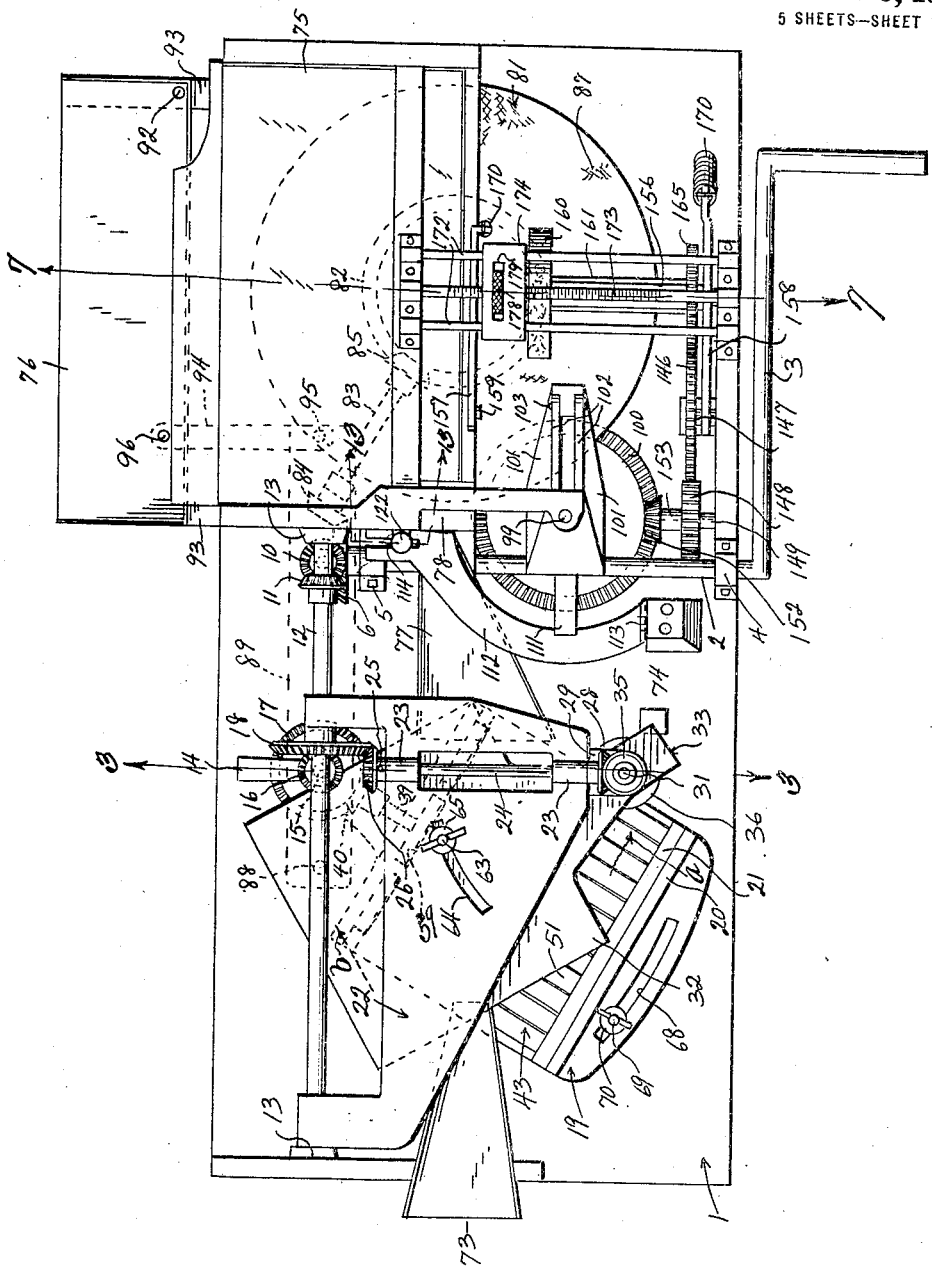

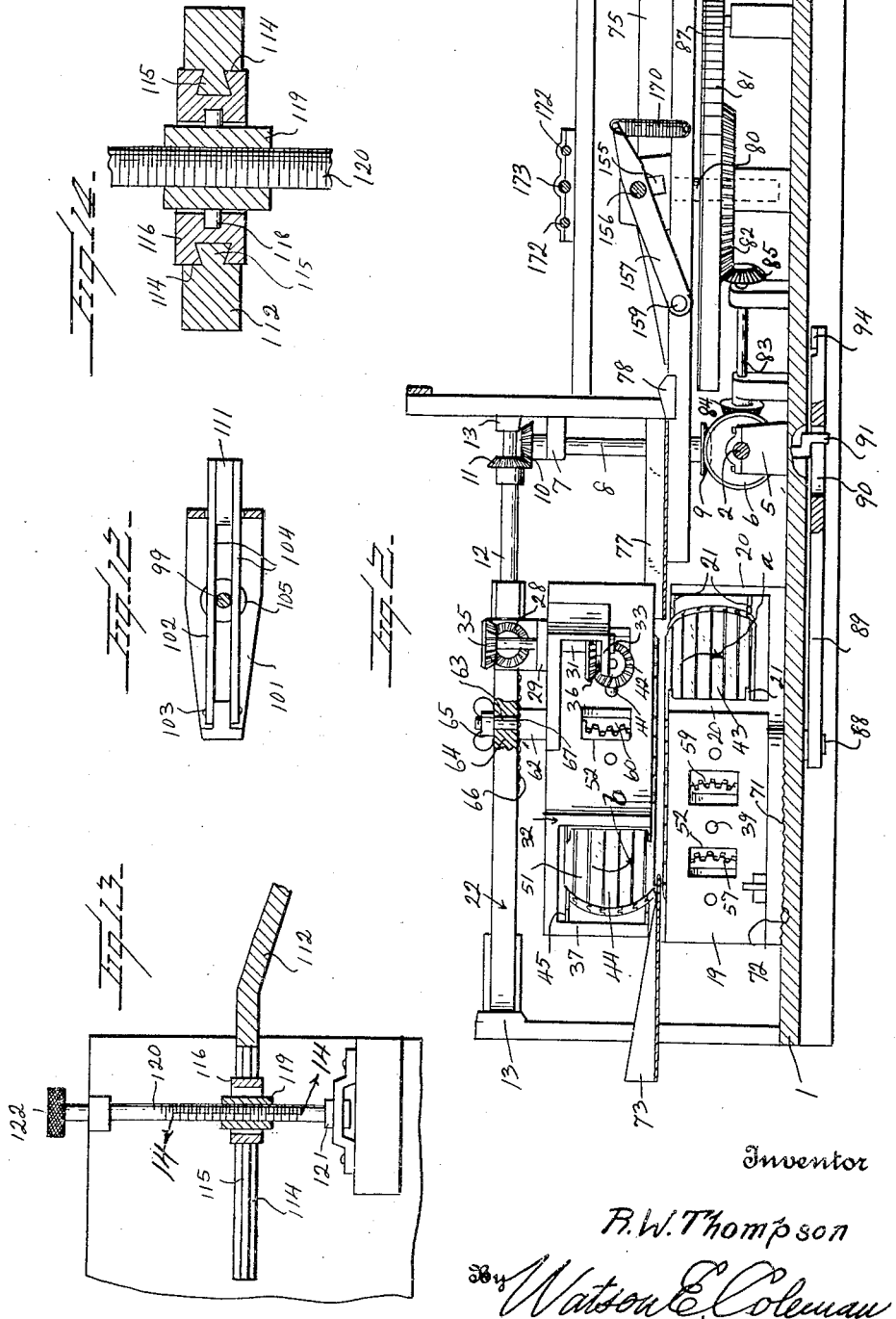

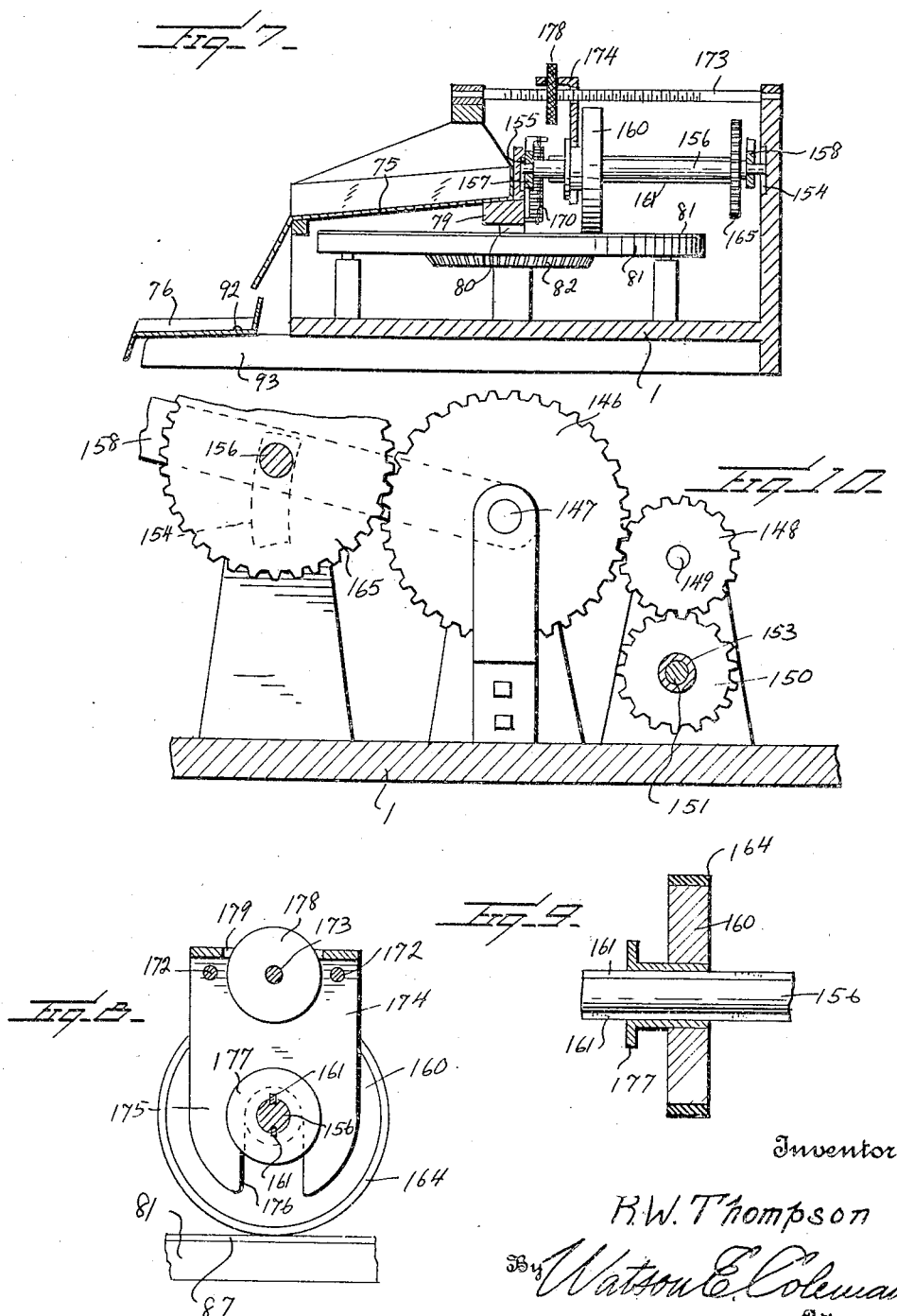

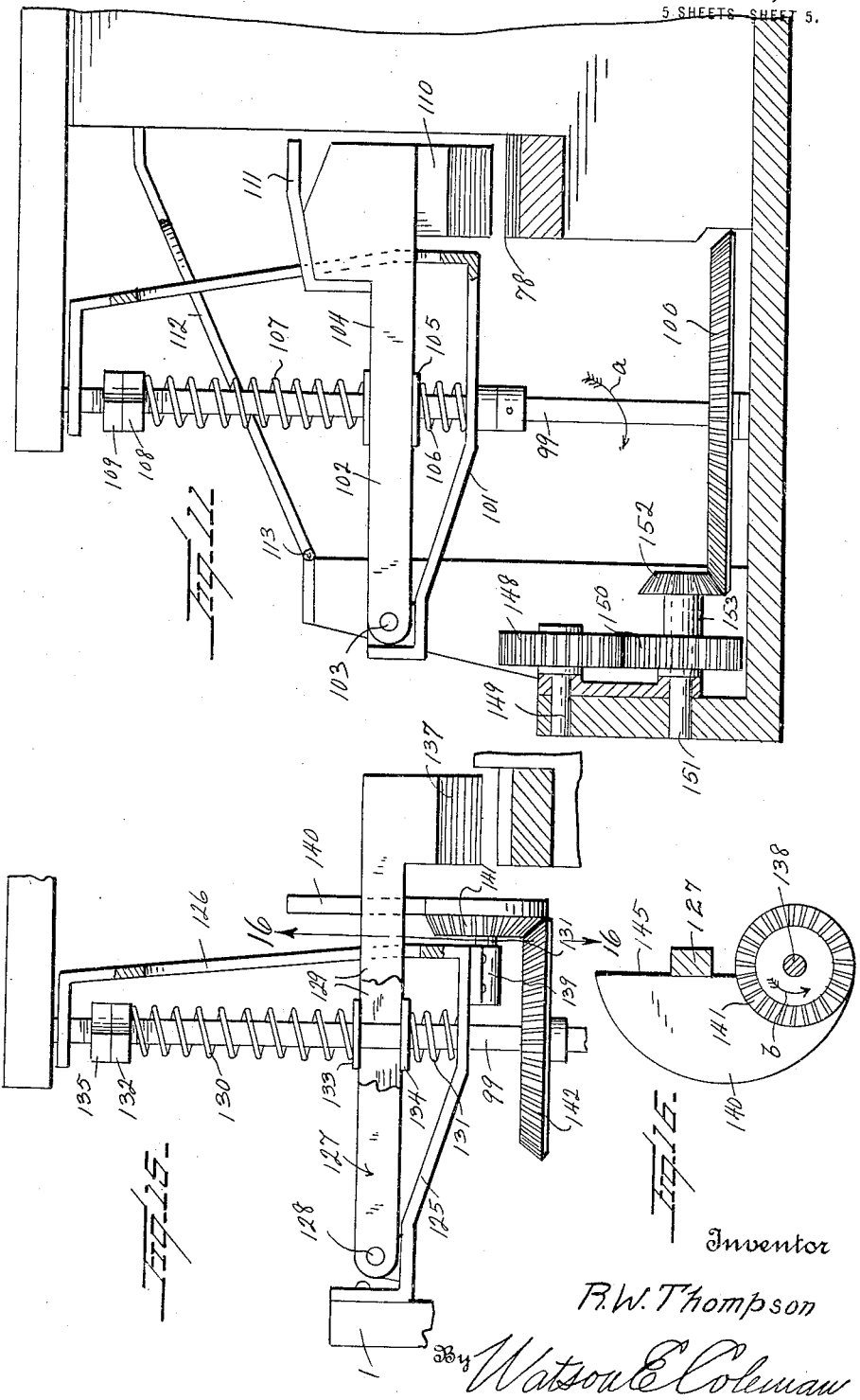

UNITED STATES PATENT OFFICE.

ROY W. THOMPSON, OF SEATTLE, WASHINGTON.

STICK-CANDY-CUTTING MECHANISM.

1,355,017.  Specification of Letters Patent.  Patented Oct. 5, 1920.

Application filed December 20, 1919. Serial No. 346,272.

*To all whom it may concern:*

Be it known that I, ROY W. THOMPSON, a citizen of the United States, residing at Seattle, in the county of King and State of Washington, have invented certain new and useful Improvements in Stick-Candy-Cutting Mechanism, of which the following is a specification, reference being had to the accompanying drawings.

This invention relates to the art of candy manufacture, and particularly to an improved stick candy twisting machine, having for its object the reduction of the cost of producing stick candy, particularly the kind which is in the form of twisted lengths.

Another object of the invention is to provide a stick candy twisting machine including means for cutting the stick candy in various lengths.

A still further object of the invention is to provide a machine of this kind, wherein a stick candy cutting mechanism is included located with relation to the guide for the stick candy, so as to cut the candy into requisite lengths (which may be different, if so desired) at the proper time, in order to prevent the stick candy from untwisting, since the stick candy as it leaves a previous supporting guide may stick or adhere to a subsequent guide.

A further object of the invention is to provide operative means between the cutting mechanism and a driven member, including means adjustable with relation to the peripheral speed of the driven member so as to regulate the interval between the cutting strokes of the cutting member of the cutting mechanism so as to vary the lengths of the stick candy.

Still a further object of the invention is to provide means for increasing and decreasing the tilt of the cutting member, so as to increase or decrease the force of the cutting stroke of the cutting member, according to the diameter of the stick of candy.

Furthermore, it is the aim to provide a cutting mechanism including a revoluble cutter and as it is revolved or rotated it is raised, so that it may be allowed to fall under the action of tensioning means to cut the candy. By providing a revoluble cutter of this kind, it is the aim to clear the way for each length of stick candy. In other words, as each length or stick is cut, the cutter moves out of the way, making one revolution for each length of candy.

Furthermore, the invention also aims to provide an agitating tray or table, to keep the sticks of candy in motion while they are yet warm so as to prevent the sticks of candy from becoming flat, or from running together, as well as preventing the obliteration of the twisted appearance. It has been found that while the sticks of candy are still warm and allowed to lay without agitation, or without turning or rolling them, they will settle down or get flat to a certain extent, hence the agitation of the candy.

The invention also aims to provide a machine of this kind including coöperative stick candy feed devices in the form of feeding belts, it being the aim to operate the belts at the same speed and at the same angles with relation to each other, the object of this being to not only feed the candy, but at the same time to impart a twist to the stick candy, and also to keep the candy straight during the time of its passage between the combined feed belts and twisters so as to pass from one guide to the other.

It is also the aim of the invention to provide an operative gearing between the combined feed belts and twisters and the driving means of the machine, which is not only efficient in every respect, but is very durably constructed and will efficiently withstand the wear by running the machine at a very rapid rate of speed.

The invention still further aims to mount the combined feeding and twisting belts so that they can be adjusted at different angles relative to each other, in order to increase or decrease the twist of the stick candy, in order to comply with the requirements of the different manufacturers, as some prefer more twists in the candy than others.

It is an additional aim of the invention to mount one of the combined feeding and twisting belts so that it can be raised and lowered, in order to permit of access to the coöperative faces of the belt to accommodate themselves to the different diameters or thicknesses of the candy.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a top plan view of the improved stick candy twisting machine constructed in accordance with the invention.

Fig. 2 is a longitudinal sectional view through the machine, showing the working parts of the machine in elevation, and showing portions of the base and parts of the lever 89 broken away to show its connection with the crank 91.

Fig. 3 is a sectional view on line 3—3 of Fig. 1, showing the parts that may appear in the rear eliminated, and illustrating the upper feed belt frame positioned so that the feed belt will appear in section transversely.

Fig. 4 is a sectional view through the upper feed belt.

Fig. 5 is an enlarged detail perspective view showing one of the links of the chain of the upper feed belt, showing the plates 47.

Fig. 6 is a detail perspective view of one of the fabric covered slats of one of the feed belts.

Fig. 7 is a sectional view on line 7—7 of Fig. 1.

Fig. 8 is a detail view of the carriage 174, showing its swivel connection with the friction wheel 160.

Fig. 9 is an enlarged detail sectional view of the shaft 156, showing the friction wheel 160 as feathered on said shaft.

Fig. 10 is an enlarged detail view in elevation of the chain of gears 146, 148, 150 and 165 for transmitting power from the shaft 156 to the gear wheel 100.

Fig. 11 is an enlarged detail view of the preferred form of the cutting mechanism and parts of the means for operating the cutting member thereof.

Fig. 12 is a detail view of the lever 102 and its pivotal connection with the frame 101.

Fig. 13 is a detail sectional view on line 13—13 of Fig. 1.

Fig. 14 is a vertical sectional view on line 14—14 of Fig. 13.

Fig. 15 is an enlarged detail view in elevation of a modified form of cutting mechanism, and the parts for operating the cutting member thereof.

Fig. 16 is a detail view on line 16—16 of Fig. 15.

Referring more especially to the drawings 1 designates the frame of the improved machine and which may be constructed of any suitable material and of any suitable construction or configuration, preferably as shown, though not necessarily.

Mounted in bearings of the frame and transversely disposed, is a driving shaft 2, and which may be operated by a crank 3, or may be geared to any suitable motor or operating means (not shown). The bearings for this driving shaft are designated by the numerals 4 and 5 and carried by the inner end of the shaft adjacent the bearing 5 is a bevel gear 6. Mounted in bearings 7 of said frame and disposed perpendicularly, is a shaft 8, and fixed to its lower end is a bevel gear 9 which meshes with the bevel gear 6. The upper end of the shaft 8 has a bevel gear 10 which meshes with a bevel gear 11 which is carried by a horizontally disposed shaft 12. This shaft 12 is mounted in suitable bearings 13 of the frame and also constitutes a supporting means for a pivotally mounted frame which carries one of the combined feeding and twisting belts.

Also mounted in bearings 14 of the frame and disposed vertically, is a shaft 15, having bevel gears 16 and 17 at its upper and lower ends. The horizontally disposed shaft 12 has an additional bevel gear 18, which meshes with the upper bevel gear 16 of the vertical shaft 15.

A frame 19 is movable in a plane in parallelism with the bottom of the main frame, and this frame 19 has pivotal engagement with the vertical shaft 15, so that the frame 19 can be adjusted on an arc whose radius extends from the vertical shaft 15. The frame 19 has opposing side walls 20, and carried by the inner faces of these side walls 20 are guides 21, on which the chains of the combined twisting and feeding belts are guided.

Pivotally mounted upon the shaft 12 is a frame or plate 22, capable of being raised or lowered and mounted in bearings 23 of this plate or frame 22 is a shaft 24. One end of the shaft 24 has fixed thereto as at 25 a bevel gear 26, also meshing with the bevel gear 18. It will be noted that the bevel gear 26 will remain in mesh with the bevel gear 18 regardless of the position of the frame or plate 22, that is to say whether it is in a lowered or raised position. The other end of the shaft 24 has secured thereto, as at 27 a bevel gear 28. Extending downwardly from one of the bearings 23 of the frame or plate 22 is an extension bracket arm 29, and the end of this bracket arm 29 constitutes a bearing 30 for a shaft 31, and also constitutes a pivot for the frame 32. The pivoted end of the frame 32 has an extension arm 33 which extends downwardly and under the frame 32, and its extremity constitutes a bearing 34 for the lower end of the shaft 31. Mounted upon the upper end of the shaft 31 is a bevel gear 35 meshing with the bevel gear 28 so that through the medium of the rotation of the shaft 24, motion is imparted to the shaft 31. The lower end of the shaft 31 carries a bevel gear 36, which transmits motion to the combined twisting and feeding belt, which is carried between the opposing walls 37 of the frame 32. The opposing walls 37 of the frame 32 have guides 38, on which the chains of the upper combined twisting and feeding belt engage. Mounted in bearings of the opposing walls 20 of the lower frame 19 is a shaft 39, provided with a bevel gear 40 at one end, meshing with the bevel gear 17 of the shaft 15. Mounted in bearings of the opposing walls 37 of the upper frame 32 is a shaft 41 having a bevel gear 42 on one end meshing with the bevel gear 36 of the shaft 31. These shafts 39 and 41 constitute means for imparting motion to the combined twisting and feeding belts, which are designated respectively 43 and 44. Each combined feeding and twisting belt comprises link chains 45, the links of which are U-shaped in cross section, and are pivotally united by means of transverse rods 46. By means of these rods 46, the links of one chain on one side of the twisting and feeding belt are held in alinement opposite the links of the opposite chain. Furthermore, these rods 46 constitute pivot means for the plates 47, which are of the shape and construction as shown in the drawings, though not necessarily, for it is obvious that they may be of any other suitable construction so long as they pivotally connect with the rods 46. The plates 47 have slots 48, which receive the ears 49 of the metallic strips 50, which are carried by the feeding and twisting slats or sections 51 of the combined twisting and feeding belt. After passing the ears 49 through the slots 48, they are bent over, in order to secure the slats or twisting sections to the plates 47. It is obvious that these ears 49 may be manipulated so that the slats or sections may be easily detached, for repairs or for cleaning purposes. In order to accomplish this, the side walls of the respective frames 19 and 32 have openings 52, in order to permit access to the ears so that they can be bent back. After bending the ears back, the sections or slats can be easily detached. In order to impart a twist or feeding action to the stick candy, it is necessary to provide a surface on the slats or sections 51 to cause a non-slipping contact with the candy. In order to attain this result, the slats or sections are covered with suitable fabric 53. This fabric may be easily removed whenever desired so that it can be renewed, or washed, and in the latter case it may be reattached to the sections or slats. The links of each of the chains of the combined twisting and feeding belts are provided with transverse pins 54, which are of diameters corresponding to the diameters of the rods 46. These pins 54 and the ends of the rods 46 where they pass through the walls of the links constitute means to be engaged by the teeth of the sprocket wheels, which are designed for driving the chain. It is to be noted that the combined twisting and feeding belts are designed to have preferably as many slats or sections as are shown in the drawings, though not necessarily, for it is obvious that any number of slats or sections may be employed. Each feeding and twisting belt includes means for driving it, and this means comprises the shafts 55 and 56. One set of shafts 55 and 56 is carried in bearings of the opposing walls 20 of the lower frame 19, whereas the other set 55 and 56 is mounted in bearings of the opposing walls 37. Each set of shafts 55 and 56 carry gear wheels 57 and 58, the teeth of which engage the links of the chains of the combined twisting and feeding belt, so as to impart movement thereto. Adjacent one of the walls 20 and carried by the shaft 39, is an additional gear wheel 59, which engages the chains of the combined twisting and feeding belt. Carried by the shaft 41 and adjacent the inner face of one of the walls 37 is a sprocket wheel 60, which engages with the chains of the upper combined twisting and feeding belt. Through the medium of the gearing mechanism above described, it will be noted how the upper and lower combined twisting and feeding belts are operated. It is the aim to dispose these combined twisting and feeding belts at intersecting angles, preferably as shown, though not necessarily, for it is obvious that the belts can be adjusted, using the shafts 15 and 31 as their pivots.

The upper frame 32 has a shouldered stud 62, the reduced end 63 of which passes upwardly through the arcuate slot 64 of the plate or frame 22. A thumb nut 65 is carried by the upper end of the reduced extension 63 so that by setting up on said thumb nut, the plate or frame 32 may be held adjusted. The under face of the plate or frame 22 is provided with a series of teeth 66 arranged on an arcuate curve concentric with the shaft 31. The shoulder of the stud 62 is provided with teeth 67 adapted to coöperate with the teeth 66 particularly when the thumb nut 65 is tightened. These coöperating teeth 66 and 67 are very shallow, and furthermore the frame 32 is sufficiently loose upon the shaft 31 as to permit the teeth 67 to disengage the teeth 66 when the thumb nut is loosened, so as to permit the shouldered stud to move in the arcuate slot of the plate or frame 22. By virtue of the pivotal mounting of the upper frame 32, the upper combined feeding and twisting belt may be adjusted on different angles relative to the path of the stick candy, in order to increase or decrease the twist, and at the same time guide the stick candy direct through the machine, without the same feeding to one side or the other.

The lower frame or plate 19 also has an arcuate slot 68, which is concentric with the vertical shaft 15. The bottom of the main frame has an upstanding stud 69 passing through the slot 68 and has a thumb nut 70. The under face of the frame 19 has teeth 71 extending radially from the shaft 15, and are designed to engage similar teeth 72 of the upper face of the bottom of the frame 1. These teeth 71 and 72 are shallow so that the lower frame 19 may easily pass over the teeth, when it is moved on an arcuate curve concentric with the shaft 15. It will be seen that the lower combined feeding and twisting belt is capable of adjustment angularly to the plane of the path of the stick candy. In fact while the angles of the combined twisting and feeding belts are opposite, they are designed to be of the same angles with relation to the path of the stick candy, so as to insure imparting a twisting action to the stick and at the same time holding the stick candy true to the path of travel. By the adjustment of the combined twisting and feeding belts, the twist of the stick candy can be increased or decreased as the case may be. Furthermore, by virtue of the gearing above described, it will be noted that the combined twisting and feeding belts are driven at the same relative speed, so that the twist of the candy will be uniform. The uniformity of the twist is also insured owing to the corresponding angles on which the twisting and feeding belts are arranged.

A stick candy guide 73 is mounted on the frame 1 so as to guide the stick candy toward and between the coöperative surfaces of the combined twisting and feeding belts. Owing to the upper twisting and feeding belt being capable of pivotal movement in a vertical plane (the shaft 12 constituting a pivot therefor) stick candy of different diameters may pass between the coöperating surfaces. In other words, by the pivotal action of the upper twisting and feeding belt, the coöperative surfaces of said belts may accommodate themselves to different diameters of stick candy. The arm or extension 33 rests upon the support 74, when the upper feeding and twisting belt is lowered to a horizontal position.

Mounted upon the frame 1 is a stationary guide 75 which is inclined so that as the lengths of stick candy are cut, they will roll or slide down the guide, and subsequently fall upon a shaking tray 76. A guide 77 extends from the lower combined feeding and twisting belt, and constitutes means for guiding the stick candy toward the guide 75. Positioned between the guides 75 and 77 is a chopping block or anvil 78, on which the candy is cut, after a requisite length of candy has passed upon the guide 75.

Mounted in bearings in the bottom of the frame 1 and the support 79 of the guide 75, is a vertical shaft 80 and revoluble with this shaft is a disk 81 having a bevel gear 82 on its under face. Mounted in bearings on the bottom of the frame 1 is a shaft 83 having a bevel gear 84 at one end, which meshes with the bevel gear 6 of the driving shaft 2. The other end of the shaft 83 has a bevel gear 85, meshing with the bevel gear 82 of the under surface of the disk 81. It will be observed that through the medium of the driving shaft 2, power is transmitted to the disk 81 through the medium of the shaft 83. The upper surface of this disk has a fabric face, such as canvas or the like 87 in order to insure friction, as will be hereinafter understood.

Pivoted at 88 to the under face of the frame 1 is a lever 89, which has a slot 90, in which a crank arm 91 of the shaft 8 engages. This crank arm cams against the longitudinal side walls of the slot 90 of the lever 89, and thereby imparts an oscillatory movement to the lever. The shaking tray 76 is pivotally mounted at 92, upon one of the projecting arms 93 of the frame 1. The other arm 93 slidably supports the oscillating tray. A link 94 is pivotally connected at 95 to one end of the lever 89, and is in turn pivotally connected at 96 to the tray. When the shaft 8 rotates, an oscillatory movement will be imparted to the lever 89 which in turn will impart an oscillatory movement to the tray 76 upon which the sticks of candy fall so as to be agitated. The agitation of the sticks of candy will keep them from flattening out, or running together or losing their twisted shape.

The claims on the twisting mechanism for the stick candy originally in this application have been divided out and form separate matter in a separate and distinct application for patent in the name of Roy W. Thompson, filed April 7, 1920, Serial Number 371,964 and allowed June 4, 1920.

The shaft 99 is mounted in bearings of the frame 1, and its lower end carries a bevel gear 100. A cutting knife guide frame 101 is movable or rotatable with the shaft 99. A lever 102 is pivotally mounted at 103 on the frame 101, and this lever has spaced arms 104 between which the vertical shaft 99 extends. Suitable washers 105 are carried by the shaft 99 one above the arms of the lever, the other below the arms. A coil spring 106 is interposed between the lower washer and the bottom of the frame 101, while the second coil spring 107 is interposed between the upper washer and a holding nut 108 which is threaded upon the shaft 99. A lock nut 109 is carried by the shaft 99 to secure the holding nut in place. By loosening the nut 109 the holding nut 108 may be adjusted on the shaft, thereby regulating the tension of the upper spring 107. The free end of the lever 102 carries a cutting knife or severing member 110, which coöperates with the chopping block or anvil, in order to cut the proper lengths of stick candy. An arm 111 is carried by the lever 102 in a position a little above the cutting knife or severing member. An arcuate inclined cam guide 112 is pivoted at 113 to one side of the frame 1. The other end of the cam guide 112 has a slot 114. The opposite longitudinal walls of the slot 114 have guiding ribs 115. Slides 116 engage the ribs 115, and fulcrumed in bearings 118, which are carried by and axially disposed on a sleeve 119. A vertical screw 120 is swiveled at 121 to a projection of the frame 1, and is in turn threaded through the sleeve 119. The upper end of the screw 120 has a head 122, which may be engaged by the hand of the operator for adjusting the screw. When the screw is so adjusted, and owing to the screw passing through and engaging the threads of the sleeve 119, the arcuate inclined cam guide 112 will be adjusted. In other words by means of the screw, the tilted position of the cam guide may be regulated. When the shaft 99 rotates in the direction indicated by the arrow $a$ the arm 111 will cam upon the inclined cam guide 112 acting to swing the lever 102 on its pivot, raising the lever sufficiently in order to permit the cutting knife or severing member to have a sufficient drop or fall, to cut the stick candy. When the arm 111 disengages from the arcuate cam guide 112, the action of the coil spring 107 will force the lever downwardly with sufficient force as to cause the knife to sever the candy which is traveling across the anvil or chopping block. When the lever 102 is actuated, the spring 106 will act to cushion, in fact absorb to some extent, the force of the blow, and then will act to cushion the rebound of the lever. By increasing the angle of the arcuate cam guide, the movement of the lever may be increased. The higher the knife is lifted, the greater the force of the blow, when it disengages the cam guide. The increasing and decreasing of the raised position of the knife in order to increase or decrease the force of the blow is designed for the purpose of accommodating stick candy of different diameters. In other words stick candy of a small diameter may be more easily cut than stick candy of a larger diameter, therefore, the screw 120 is adjusted accordingly.

In Fig. 15 of the drawings, a modified construction of a cutting mechanism is employed. This modified construction of cutting mechanism comprises a supporting frame 125, which is suitably fixed to the side of the frame 1, as illustrated, though not necessarily. One end of this frame has a guide slot 126 in which the lever 127 is guided when tilted. This lever 127 is pivoted at 128 to the fixed end of the frame 125. The lever 127 has spaced arms 129, between which the shaft 99 engages. Springs 130 and 131 are mounted upon the shaft 99, the spring 130 engaging between the holding nut 132 and a washer 133 while the spring 131 is interposed between the lower part of the frame 125 and a washer 134. These washers 134 and 133 are disposed above and below the arms or under face of the lever 127. A lock nut 135 is threaded upon the shaft 99 and is designed for the purpose of locking the holding nut 132 in position, when it is adjusted. The nut 132 constitutes means for regulating the tension of the spring 130 when it is desired to increase or decrease the force of the blow of the cutting knife or severing member 137 which is carried by the lever 129. A shaft 138 is mounted in a bearing 139 of the frame 125. In fact the shaft 138 is fixed in the bearing and rotatably mounted in any suitable manner upon the shaft 138 is a cam 140. One face of the cam 140 carries a bevel gear 141, which meshes with a bevel gear 142 which is carried by and rotatable with the shaft 99. When the shaft 99 rotates, motion is imparted to the cam 140, for the purpose of raising and lowering the lever, which carries the cutting knife or severing member. It will be noted that in this modification of the candy severing mechanism, the lever which carries the cutting knife is not revoluble in its movement, but is carried by a fixed frame. In fact the frame 125 substantially corresponds to the construction of the frame previously described, with the exception that it is fixed, instead of being revoluble with the shaft 99. The spring 131 in this instance, not only compensates for the rebound of the lever 127 but also acts to lift the lever sufficiently in order to dispose the knife high enough to permit the stick candy to pass thereunder, as each length is cut. The cam 140 is designed to rotate in the direction of the arrow $b$ and after it has completed a single revolution, the lever being raised by riding upon the eccentric portion of the cam, the lever will reach the terminal of the eccentric edge of the cam and then disengage the same, and subsequently drop or fall in a plane parallel with the edge 145 of the cam, allowing the knife or severing member to coöperate with the chopping block or anvil for severing the candy. In either of the severing or cutting mechanisms, the shaft 99 rotates. However, in the preferred form, the frame is rotatable with the shaft whereas in the modified form the frame 125 is stationary relatively to the shaft.

In order to impart motion to the shaft 99, a gear mechanism is necessary, and such a gear mechanism comprises a driven gear 146 which is mounted upon a stub shaft 147. The gear 146 meshes with the pinion 148 which is rotatable on a stub shaft 149. The pinion 148 in turn meshes with a second pinion 150, which is rotatable on the shaft 151. The shaft 151 is stationary with the frame 1, and also rotatable upon it, is a bevel gear 152. The bevel gear 152 and the gear 150 are connected by a sleeve 153 so that the pinion and the bevel gear will rotate as one body. The bevel gear 152 meshes with the bevel gear 100 so that when motion is imparted to the driven gear 146, power is transmitted to the shaft 99 which in turn will revolve with the frame in the preferred form of the cutting mechanism, or the cam 140 in the modified form of the cutting mechanism.

The frame 1 is provided with opposite arcuate slots 154 and 155, which are concentric with an axis extended from the stub shaft 147, and engaging these arcuate slots are the reduced ends of the shaft 156. Plates 157 and 158 are pivoted at 159 axially with the stub shaft 147, and engaging in bearings of these plates 157 and 158 are the reduced ends of the shaft 156. A wheel 160 is keyed upon the shaft 156 by the feathers 161. It will be noted that the wheel 160 is capable of rotating with the shaft 156 and at the same time it is capable of adjustment longitudinally on the shaft, that is to say axially thereon. This wheel 160 has a friction band 164, adapted to frictionally engage the fabric facing 87 of the disk 81, so that motion may be imparted to the shaft 156. One end of the shaft 156 carries a gear wheel 165 which meshes with the gear 146 so that motion may be transmitted to the gear 100 through the medium of the friction gear. It will be noted that when the friction wheel 160 is moved to a position very close to the center of the disk 81, the peripheral speed of the friction wheel 160 will be reduced, thereby transmitting a slower revoluble movement to the revolving knife or to the cam, hence increasing the interval between the time of the rise of the knife and the release or fall of the knife, hence increasing the length of the stick candy. When the friction wheel is adjusted to a position very close to the outer edge of the disk 81, the peripheral speed of the friction wheel will be increased, thereby increasing the speed of the knife or the cam 140, thereby decreasing or shortening the interval between the time of the rise of the knife and its release, which will cause shorter sticks of candy to be cut.

The plates 157 and 158 have projecting arms to which coil springs 170 are connected. The coil springs are in turn connected to the frame 1. By means of the coil springs, a tensioning action is imparted on the plates 157 and 158 so as to increase the frictional bearing contact between the friction wheel and the friction fabric facing of the disk 81, thereby insuring transmission of power from one to the other. It will be noted that when the friction wheel is nearer the outer edge of the disk 81 than to its center, tension of the inner spring will somewhat overbalance the tension of the outer spring, though the outer spring is longer. When the friction wheel is nearer the center of the disk 81 than to the outer edge thereof, the outer spring will overcome the tension of the inner spring. When the friction wheel engages about midway the reduction of the friction disk, still the tension of the outer spring will be slightly greater than the tension of the inner spring. In either instance, the spring constitutes means to hold the friction wheel closely in frictional contact with the frictional disk.

Mounted upon the frame 1 is a pair of guide rods 172, and also a screw rod 173. The guide rods and screw rods are in parallelism. Mounted upon the guide rods 132 is a carriage 174. This carriage has a depending part 175, which is bifurcated as shown at 176 for the reception of the shaft 156. This depending part 175 engages between a disk 177 and one face of the friction wheel. The disk 177 is carried by and rotatable with one face of the friction wheel. In other words, the friction wheel is swivelly connected to the carriage so that by moving the carriage in one direction or the other, radially with relation to the center of the friction disk 81, the peripheral speed of the friction wheel may be changed. In order to adjust the carriage, a hand wheel 178 is swiveled in the carriage, by engaging a slot 179 formed in the carriage. This hand wheel is threaded to the threaded rod 173 and its peripheral edge is knurled as shown so as to prevent slipping of the hand of the operator. When the hand wheel is adjusted rotatably upon the rod in one direction or the other the carriage may be moved radially with the center of the friction disk 81.

In the manufacture of stick candy with this improved machine, it is the aim to provide the candy before it is twisted with stripes, though not necessarily, for it is obvious that plain colors of candy may be used. However, the stripes when the stick candy is twisted will more plainly disclose the twisted effect of the candy. Furthermore, stick candy that has an edge may be twisted with this machine and in this case the edge will disclose the twist.

The stick candy first enters the guide 73, then passes between the twisting and feeding belts, then through the guide 77 across the anvil or chopping block and then upon the guide 75. At different intervals, according to the speed of the cutting knife or severing member, the knife will coöperate with the anvil or chopping block to cut the stick candy in lengths. These lengths roll down the guides 75 and then upon the tray 76 where the stick candy is agitated so as to prevent it from losing its shape. When the upper twisting and feeding belt is tilted on the shaft 12 the twisting faces of the sections of said belts may be cleaned or otherwise repaired, or the sections of the belts removed.

Stick candy when made by the use of this improved machine can be manufactured more rapidly, than can be twisted by hand, thus causing a great saving of time and labor. Furthermore by means of this machine, a smoother and steadier twisting action can be imparted to the belts, which will transmit a more uniform twist to the stick candy.

In twisting the candy, the candy is passed in the machine over the guide 73 and then between the combined twisting and feed belts which are designed to move in the directions of the arrows $a$ and $b$ shown clearly in Figs. 1 and 2. In fact, the lower combined feed belt and twister moves in a direction forwardly of the machine and slightly laterally to the right, while the upper combined feed belt and twister rotates forwardly and slightly laterally to the left. Owing to the two combined belts and twisters so moving, one practically laterally in one direction and the other laterally in the other direction, but both forwardly, causes the candy to twist, particularly as the main body of the candy, before it enters the guide 73, is supported against rotative movement. It is obvious that by changing the angles of the combined feed belts and twisters, the twisting of the stick candy can be varied. In other words, by moving the lower feed belt and twister so as to change the angle more to the right and the upper feed belt and twister so as to move laterally more to the left, a greater twist may be imparted to the stick candy.

The invention having been set forth, what is claimed as new and useful is:—

1. In a stick candy cutting machine, the combination with a frame, of a revoluble shaft mounted in bearings thereof, a frame revoluble with the shaft, a cutting member pivoted on the revoluble frame, tensioning means for the cutting member for causing the member to impart cutting actions to the stick candy, means for absorbing the rebound of the cutting member, an arcuate inclined cam guide for raising the cutting member against the action of its tensioning means, whereby when the cutting member disengages from the guide, the member will be actuated by the tensioning means, and means for adjusting the cam guide, to increase or decrease the height of the fall of said cutting member.

2. In a stick candy cutting machine, the combination with a frame, of a revoluble shaft mounted in bearings thereof, a frame revoluble with the shaft, a cutting member pivoted on the revoluble frame, tensioning means for the cutting member for causing the member to impart cutting actions to the stick candy, means for absorbing the rebound of the cutting member, an arcuate inclined cam guide for raising the cutting member against the action of its tensioning means, whereby when the cutting member disengages from the guide, the member will be actuated by the tensioning means, and means for adjusting the cam guide, to increase or decrease the height of the fall of said cutting member, and a speed changing means operatively connected with and operating the shaft, whereby the intervals between the raising actions of the cutting member may be varied.

3. In a stick candy cutting mechanism, the combination with a frame, of a shaft mounted therein, a cutting member supporting frame revoluble in a horizontal plane, a cutting member bodily revoluble in the same plane and being tiltably mounted on said frame, tensioning means for the cutting member, to impart a downward movement to the cutting member for cutting the candy, means for raising the cutting member as it revolves, and speed changing means operatively connected to the shaft for varying the speed of the shaft.

4. In a candy machine, a cutting mechanism for the stick candy including a cutting member revoluble in a horizontal plane, means for feeding the stick candy under the cutting member, operating means for the feeding means and being operatively connected with the cutting mechanism for operating the cutting member, means for raising and lowering the cutting member with respect to said plane as the cutting member is revolved and speed changing means coöperating with a member of said operative connections for varying the period of the raising actions of the cutting member and the cutting movement of the cutting member relatively to the feeding means, thereby varying the length of the stick candy.

5. In a candy machine, a candy guide, a cutting mechanism including a cutting member for cutting the candy passing through the guide, means for revolving the cutting member, means for raising the cutting member as it is revolved, speed changing means for varying the period of revolution of the cutting member so as to vary the length of the stick candy, and means for adjusting the raising means for varying the force of the cutting movements of the cutting member.

6. In a candy machine, a candy guide, a cutting mechanism including a cutting member for cutting the candy passing through the guide, means for feeding the stick candy under the cutting member, means operated by the feeding means for revolving the cutting member, tensioning means for the cutting member, an adjustable device for raising the cutting member as it is revolved in order to vary the force of the cutting actions of the cutting member, and a speed changing mechanism for varying the period of revolution of the cutting member relatively to the feeding means in order to vary the length of the stick candy.

7. In a candy machine, a candy guide, a cutting mechanism for the stick candy including a cutting member for cutting the candy passing through the guide, means for revolving the cutting member, an inclined arcuate cam for raising the cutting member as it is revolved, and means for adjusting said cam for varying the force of the cutting actions of the cutting member.

8. In a candy machine, a candy guide, a cutting mechanism for the stick candy including a cutting member for cutting the candy passing through the guide, means for revolving the cutting member, an inclined arcuate cam for raising the cutting member as it is revolved, and means for adjusting said cam for varying the force of the cutting actions of the cutting member, and means for varying the period of revolution of said cutting member thereby varying the length of stick candy.

9. In a candy machine, a candy guide, a cutting mechanism including a cutting member for cutting the candy passing through the guide, means for revolving said member, tensioning means for the member, and adjustable means for raising the member against the action of the tensioning means while the member is being revolved thereby varying the force of the cutting actions of the member.

10. In a candy machine, a candy guide, a cutting mechanism including a cutting member for cutting the candy passing through the guide, a revoluble element, a support thereon operatively carrying the cutting member, adjustable cam means for raising the cutting member during its revoluble actions to vary the force of the cutting actions.

11. In a candy machine, a candy guide, a cutting mechanism including a cutting member for cutting the candy passing through the guide, a revoluble element, a support thereon operatively carrying the cutting member, adjustable cam means for raising the cutting member during its revoluble actions to vary the force of the cutting actions, and means for varying the revoluble movement of the element thereby varying the revoluble movement of the cutting member relatively to its raising actions to vary the length of the candy.

12. In a candy machine, a candy guide, a cutting mechanism for stick candy including a cutting member for cutting the candy passing through the guide, a revoluble element, a support operative therewith and operatively supporting said cutting member, an inclined arcuate cam for raising the cutting member during its interval of revolution, and means for revolving the element.

13. In a candy machine, a candy guide, a cutting mechanism for stick candy including a cutting member for cutting the candy passing through the guide, a revoluble element, a support operative therewith and operatively supporting said cutting member, an inclined arcuate cam for raising the cutting member during its interval of revolution, means for revolving the element, a device for adjusting the cam for varying the fall of the cutting member, and tensioning means for the cutting member, the actions of which being increased or decreased according to the adjustment of the cam to increase the force of the cutting actions of the cutting member.

14. In a candy machine, a candy guide, a cutting mechanism for stick candy including a cutting member for cutting the candy passing through the guide, a revoluble element, a support operative therewith and operatively supporting said cutting member, an inclined arcuate cam for raising the cutting member during its interval of revolution, means for revolving the element, and means for varying the period of revolution of the element to increase or decrease the length of stick candy to be cut.

In testimony whereof I hereunto affix my signature.

ROY W. THOMPSON.